Jan. 29, 1929. 1,700,236
J. F. O'CONNOR
FRICTION SHOCK ABSORBING MECHANISM
Original Filed Dec. 3, 1925  2 Sheets-Sheet 2
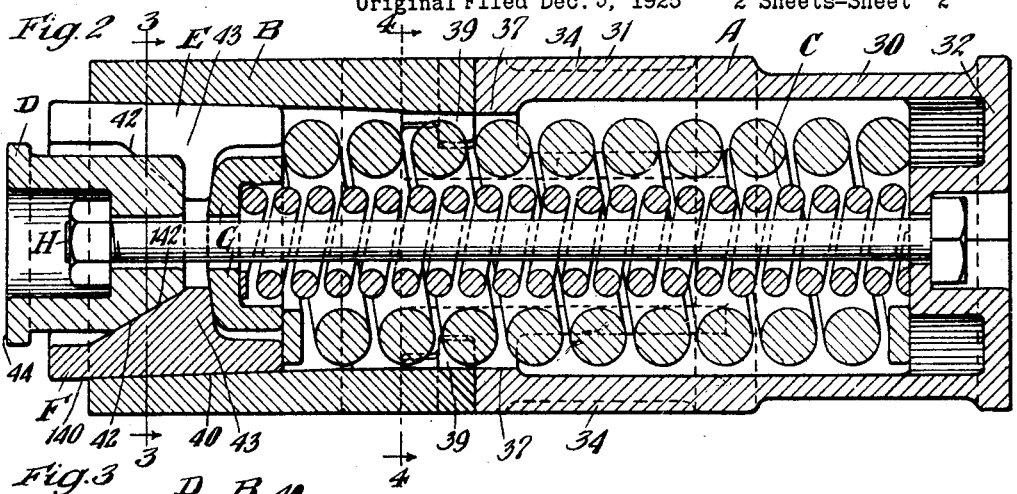
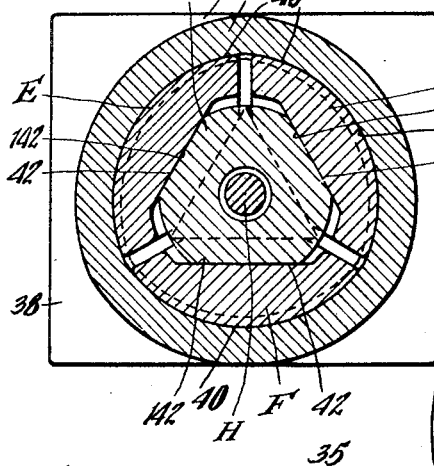
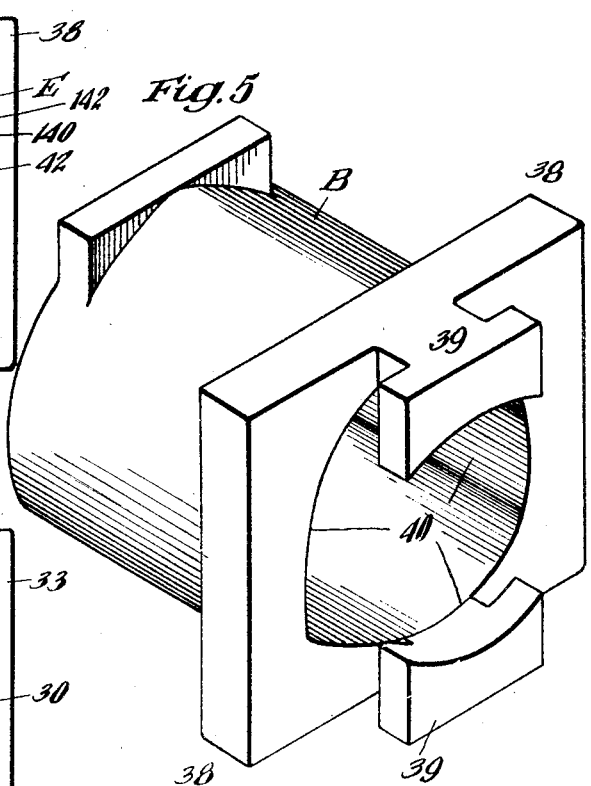
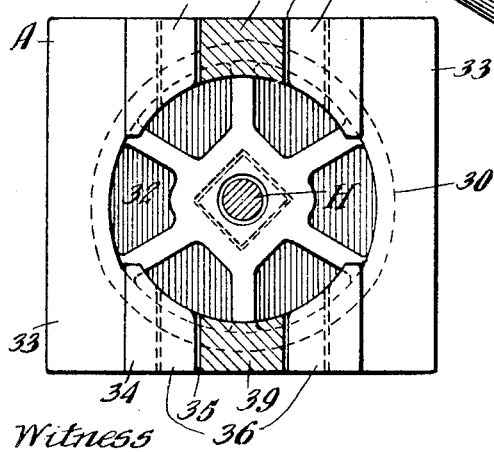
Witness
Wm. Geiger
Inventor
John F. O'Connor
By George I. Haight
His Atty Patented Jan. 29, 1929.

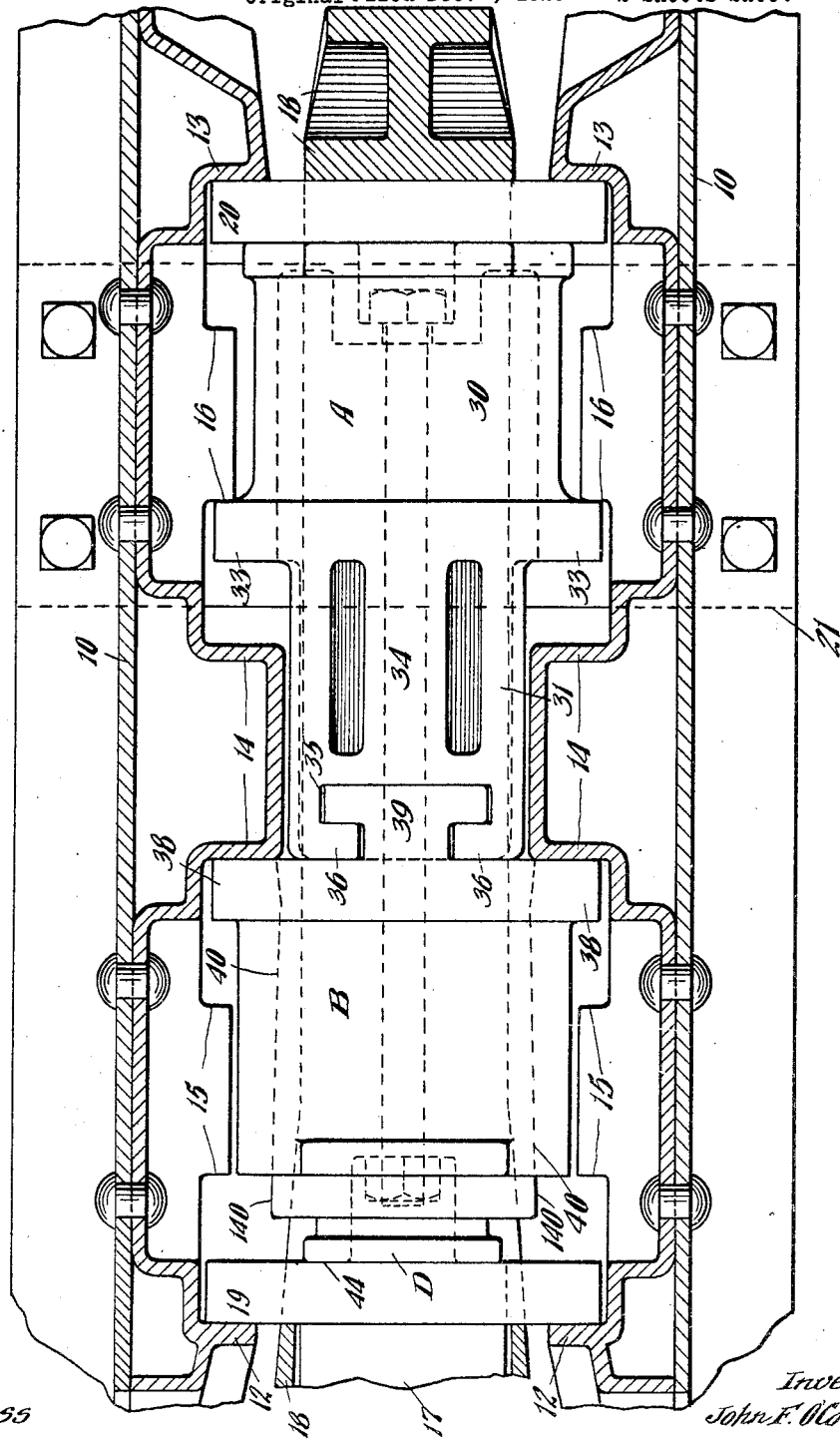

1,700,236

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 3, 1925, Serial No. 72,865. Renewed October 1, 1927.

This invention relates to improvements in friction shock absorbing mechanisms.

One object of the invention is to provide a friction shock absorbing mechanism, especially adapted for railway draft riggings, having the usual stop castings arranged for spring draft gears of the tandem spring type, including a spring cage and a detachable friction shell, thereby providing for renewal of the shell independently of the spring cage when the shell becomes worn, the shell having a friction wedge system co-operating therewith, wherein the friction shell and spring cage are provided with stop elements designed to co-operate with the intermediate stop elements commonly employed in connection with draft riggings of the tandem spring type.

Another object of the invention is to provide a friction shock absorbing mechanism of the character indicated having a spring cage and a friction shell and the usual main spring resistance, wherein the friction shell and cage have co-operating holding means thereon for detachably connecting the shell and cage, permitting the cage and shell to be assembled by relative lateral movement thereof and preventing longitudinal movement of the shell and cage with reference to each other when assembled and wherein the spring resistance extends into the friction shell, preventing relative separation of the shell and cage laterally.

A still further object of the invention is to provide a mechanism of the character set forth adapted for use in connection with stop castings usually employed for use in connection with spring gears of the tandem type, including a spring cage and detachable friction shell, wherein the cage and shell are each provided with individual stop flanges adapted to co-operate with the usual intermediate stop lugs provided in connection with a draft rigging of the tandem spring type.

Other objects and advantages of the invention will more clearly appear from the description and claims hereinafter following.

In the drawings forming a part of this specification, Figure 1 is a horizontal longitudinal, sectional view of a railway draft rigging, illustrating my improvements in connection therewith, the friction shell and spring cage and followers being shown in plan. Figure 2 is a longitudinal, vertical, sectional view of the shock absorbing mechanism proper. Figures 3 and 4 are transverse, vertical, sectional views, corresponding respectively to the lines 3—3 and 4—4 of Figure 2. And Figure 5 is a detailed, perspective view of the detachable friction shell.

In said drawings, 10—10 indicate the usual channel shaped center or draft sills of a railway car underframe, to the inner surfaces of which are secured side plates or stop castings 11 commonly employed in spring draft riggings of the tandem type, and in connection with which my improved gear is particularly designed for use. The stop castings 11 have the usual front and rear stop shoulders 12 and 13, intermediate or middle main stop shoulders 14, front limiting shoulders 15—15 and rear limiting shoulders 16—16. The inner end of the drawbar is designated by 17, to which is operatively connected a hooded cast yoke 18 of well-known form. The shock absorbing mechanism proper, hereinafter more fully described, as well as the main front and rear followers 19 and 20 are disposed within the yoke. The yoke and the parts therewithin are supported in operative position by a detachable saddle plate 21.

The improved shock absorbing mechanism proper, as shown, comprises broadly a spring cage A; a friction shell B; a main spring resistance member C; a wedge block D; friction shoes E, E and F; a spring follower G and a retainer bolt H.

The spring cage A is in the form of a hollow casing having a substantially cylindrical rear section 30 and a substantially rectangular front section 31 formed integral therewith. At the rear end, the cage has a transverse wall 32 adapted to bear on the rear follower 20. Substantially midway between the ends and intermediate the sections 30 and 31, the casing has a pair of lateral flanges 33 adapted to cooperate with the rear intermediate main shoulders 14 and the corresponding limiting shoulders 16. The rectangular section 31 is adapted to work freely between the side castings as most clearly shown in Figure 1. The rectangular section 31 is open at opposite sides as most clearly shown in Figure 4, thereby presenting top and bottom, horizontally disposed arms 34—34. The section 30 has a cylindrical bore adapted to accommodate the spring resistance C, and the arms 34 of the section 31 are provided with concave interior surfaces forming continuations of the side wall of the bore of the section 30. At the outer ends, the arms 34 are provided with vertically aligned slots 35 of T-form, as most clearly shown in Figure 1, a pair of inturned lugs 36 being thus provided at the front end of each arm. The walls of the spring cage are preferably thickened at the outer end as shown, slightly reducing the bore of the cage as indicated at 37, and giving increased strength to the lugs 36.

The friction shell B is of generally cylindrical form and has a rectangular heavy plate-like section 38 at the rear end thereof formed integral therewith. The plate-like section 38 projects laterally from the opposite sides of the cylindrical section and functions in the manner of a follower cooperating with the front, intermediate main stop shoulders 14 and the corresponding limiting shoulders 15. At the rear end, the shell B has a pair of top and bottom T-shaped lugs 39 rearwardly extending from the plate-like section 38 and integral therewith. The T-shaped lugs are engaged within the T-shaped slots of the spring cage A, thereby locking the cage and shell together against relative longitudinal movement. The friction shell also has three interior true cylindrical friction surfaces 40 converging inwardly of the mechanism.

The friction shoes E, E and F are of similar construction, except as hereinafter pointed out. Each shoe is formed with an outer true cylindrical friction surface 140, adapted to cooperate with the corresponding shell friction surface 40 and an inner wedge face 42, formed on the front side of a lateral enlargement 43 of the shoe. The face 42 of the shoes E extends at a relatively blunt angle with respect to the longitudinal axis of the mechanism and the face 42 of the shoe F extends at a relatively keen angle to said axis. The rear faces of the enlargement 43 bear on the spring follower G, which is in the form of a cap. The auxiliary spring follower G, at its inner end, in turn bears on the forward end of the outer coil of the main spring resistance C, while the inner coil of said spring resistance extends within the cap and bears on the inner side of the end wall thereof.

The wedge D is in the form of a cast block, suitably cored and having a flat front face 44 bearing directly on the front follower 19. At the inner end, the block D is provided with three rearwardly converging wedge faces 142—142 arranged symmetrically about the axis of the mechanism. Two of the faces 142 co-act with the faces 42 of the two blunt angular shoes E and are correspondingly inclined thereto whereas the remaining face 142 of the wedge is inclined to correspond with the wedge faces 42 of the block F and adapted to cooperate therewith.

The main spring resistance C comprises an inner relatively light coil and an outer relatively heavier coil, the former being on the outer end of a hollow boss projecting from the end wall 32 of the spring cage A and the outer coil bearing at its rear end on webs extending radially from said boss and formed integral with the rear wall and side walls of the spring cage. In this connection, it is pointed out that the front end of the outer coil of the main spring resistance bears on the inner ends of the friction shoes in addition to bearing on the inner end of the spring follower G.

As most clearly shown in Figure 2, the spring resistance C which is disposed within the spring cage extends forwardly into the friction shell to an appreciable extent, thereby preventing relative lateral movement of the friction shell and spring cage and thus preventing separation of these parts laterally when the mechanism is finally assembled.

The retainer bolt H which holds the mechanism assembled, and of overall uniform length has its opposite ends anchored respectively to the hollow lug on the wall 32 of the spring cage and to the wedge member D. In addition to maintaining the parts assembled, the retainer bolt holds the mechanism, including the main spring resistance, under a predetermined initial compression, thereby compensating for wear of the various friction and wedge faces.

The mechanism is assembled as follows: The T-shaped lugs 39 of the friction shell B are brought into lateral alignment with the T-shaped slots of the spring cage and engaged within the latter by moving the friction shell laterally with reference to the spring cage, thereby locking the parts in position against relative longitudinal movement. The main spring resistance, spring follower cap G, friction shoes E, E and F and main wedge D are then inserted in the spring cage and friction shell, and the parts secured by the retainer bolt H. Inasmuch as the main spring resistance extends into the friction shell and the outer diameter of the outer coil of the main spring resistance closely approaches in size the interior of the friction shell and spring cage respectively, the main spring resistance substantially prevents lateral, relative movement between the friction shell and spring cage, effectively locking the parts together.

It will be evident that when the friction shell becomes worn, the same may be readily replaced by a new shell, it being merely necessary to remove the friction shoes, wedge, spring follower, and main spring resistance elements of the mechanism to permit disengagement of the shell in a lateral direction with reference to the cage.

The operation of my improved shock absorbing mechanism, assuming a compression stroke, is as follows: The follower 19 and the combined friction shell and spring cage will be moved relatively to each other, causing the wedge block D to be forced inwardly of the mechanism and placing the friction shoes E, E and F under lateral pressure and forcing the same inwardly of the shell against the resistance of the main spring. It will be evident that during the inward movement of the parts of the friction shell, which has the follower section thereof cooperating with the front intermediate main stop members 14, will resist the movement of the friction elements independently of the spring cage, the latter resisting the pressure of the main springs. The compression of the mechanism will continue until the outer end of the friction shell is engaged by the front follower 19, whereupon the force will be transmitted directly through the shell B to the front intermediate main stop lugs 14. When the actuating force is reduced, the main spring C will effect restoration of all the parts to normal position.

It will be evident that there will be substantially only slight wedging action between the blunt wedge faces of the wedge and shoes, developed by differential action due to the taper of the shell, while a true wedging action will be effected between the co-operating keen faces of the wedge and the shoes F. Due to the employment of the blunt and keen sets of wedge faces, a very high wedging action is obtained during the compression stroke, since the keen wedge faces may be made relatively acute without the danger of the parts sticking, the blunt wedge faces acting more or less as a "safety valve". In this connection, it will be understood by those skilled in the art that my improvements are capable of use in a mechanism either employing a blunt and keen angle system of wedge faces or wedge faces which are all at the same angle with respect to the axis of the mechanism.

From the preceding description taken in connection with the drawings, it will be evident that I have provided a very simple and efficient arrangement of combined spring cage and detachable friction shell, which may be employed in connection with the usual side castings commonly used with tandem spring gears, wherein the friction shell which is detachably connected to the spring cage is provided with independent follower means which cooperates with the intermediate stop lugs of the side castings, thereby relieving the detachable connection between the shell and cage of undue strain.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a spring cage casting; of a detachable friction shell, said shell and cage having inter-engaging holding means thereon for detachably connecting the shell to the cage, permitting the cage and shell to be assembled by relative lateral movement thereof and preventing relative longitudinal movement of the cage and shell when assembled; a friction wedge system within the friction shell; and a spring resistance in the spring cage, co-operating with said wedge system, said spring resistance extending into the shell, thereby preventing lateral separation of the shell and cage.

2. In a railway draft rigging, the combination with side castings, having intermediate stops; of a friction shell having follower means thereon cooperating with one of said intermediate stops; of a spring cage detachably secured to said shell and preventing longitudinal separation thereof; a friction system within said shell; and spring resistance means within the cage cooperating with the friction system.

3. In a railway draft rigging, including side castings having intermediate stops; of a friction shell; a spring cage, said shell and cage having means thereon for detachably connecting the same; follower acting means on said cage and shell respectively, said follower means cooperating with said intermediate stops; a friction system cooperating with the shell; and a spring resistance opposing movement of said system, said spring resistance being disposed within the spring cage.

4. In a railway draft rigging, the combination with side castings having intermediate stops; of a spring cage casting; a detachable friction shell, said shell and cage having inter-engaging holding means thereon for detachably connecting the shell to the cage, permitting the cage and the shell to be assembled by relative lateral movement thereof and preventing relative longitudinal movement of the cage and shell when assembled, said shell having follower means thereon cooperating with certain of said intermediate stop shoulders; a friction wedge system within the friction shell; and a spring resistance within the spring cage cooperating with said wedge friction system, said spring resistance extending into the shell, thereby preventing lateral separation of the shell and cage.

5. A combined friction shell and spring cage, including a spring cage section closed at one end, said shell at its opposite end being of restricted width to pass between the usual middle stops of tandem castings and having spaced arms at said opposite end, and a friction shell section, said shell section having top and bottom arms, said arms of the shell and cage having interlocking means thereon for detachably connecting the shell to the cage.

6. A combined friction shell and spring cage, including a spring cage section having a pair of spaced arms at one end thereof, the free ends of said arms having T-shaped slots therein, and a friction shell section having T-shaped lugs at the inner end thereof engageable within said slots for detachably connecting the shell and cage sections.

7. In a railway draft rigging, having side castings provided with front, rear and intermediate stops, the combination with front and rear follower members movable relatively toward each other and adapted to co-operate with said front and rear stops; of a spring cage cooperating with one of said followers and having an integral follower section adapted to cooperate with certain of said intermediate stops; a friction shell connected to said cage and having an integral follower section adapted to cooperate with others of said intermediate stops, said shell having interior inwardly converging friction surfaces; a plurality of friction shoes cooperating with said shell friction surfaces; a wedge engaged by the other main follower, said wedge and shoes having a plurality of sets of co-operating wedge faces, certain of said co-operating faces being disposed at relatively keen wedge acting angles with respect to the longitudinal axis of the mechanism and the remaining co-operating faces being disposed at relatively blunt non-wedge-acting angles with respect to said axis; and a main spring resistance within said cage extending into the shell and co-operating with the friction shoes.

8. In a railway draft rigging, the combination with tandem spring side plates, each having front and rear stop shoulders and middle main stop shoulder and a front and rear limiting stop shoulder; of a spring cage; a friction shell detachably secured to the spring cage, said shell cage being movable longitudinally of the rigging, said shell having follower means thereon at the inner end co-operating with the middle main stop shoulder of the side plates and the limiting stop shoulder at the corresponding end of the rigging to limit the inward and outward movement of the shell; a friction system within the shell, and spring resistance means co-operating with the friction system.

9. In a railway draft rigging, the combination with side castings, having main and limiting stop shoulders; of a friction shell having follower means thereon co-operable with said limiting stop shoulders; a separate spring cage detachably secured to the shell against longitudinal movement with respect to the same; friction means co-operating with the shell; and spring resistance means co-operating with the friction means.

10. In a draft rigging, the combination with side castings having sets of main shoulders and a set of limiting stop shoulders; of a spring cage; a friction shell having follower acting flanges adapted to co-operate with one set of said main stop shoulders and with said limiting stop shoulders, said spring cage being detachably secured to the shell to hold said shell and cage against relative displacement longitudinally of the mechanism; a spring resistance; and a friction system co-operating with the shell.

11. In a draft rigging, the combination with side castings having sets of main stop shoulders and a set of limiting stop shoulders; of a friction shell; a spring cage having follower acting flanges co-operable with one of said sets of main shoulders and the set of limiting shoulders; detachable interconnecting means fixedly securing the shell to the cage; a spring resistance; and a friction system co-operating with the shell.

12. In a draft rigging, the combination with side castings having sets of main stop shoulders and a set of limiting stop shoulders; of a spring cage member; a friction shell member, said members comprising separate castings, each of said members being provided with follower acting means; and means for detachably securing said members in fixed relation with each other.

13. In a draft rigging, the combination with side castings having sets of main stop shoulders and a set of limiting stop shoulders; of a combined friction shell and spring cage, including separate friction shell and spring cage castings; connecting means detachably joining the spring cage casting to the shell casting against relative displacement longitudinally of the mechanism; follower acting flanges on each of said castings; a spring resistance within the cage; and a co-operating friction means within the shell, including friction shoes and a wedge pressure transmitting member.

14. In a draft rigging, the combination with tandem side castings having main front, rear and middle stop shoulders and front and rear sets of limiting stops; of a friction spring gear cooperable with said side castings, said gear comprising: a short friction shell casting located transversely between one set of said limiting stops and having a follower-acting flange at the end nearest the main middle stop shoulders; a relatively long separate spring cage casting having a transversely narrowed portion at the end adjacent the friction shell casting and which narrowed portion is disposed between said main middle stop shoulders; means connecting the adjacent ends of said two castings whereby the same are movable longitudinally as a unit; friction elements cooperable with the shell casting; and spring means within the cage casting and cooperable with said elements.

In witness that I claim the foregoing I have hereunto subscribed my name this 28th day of November, 1925.

JOHN F. O'CONNOR.